Nov. 29, 1960 C. H. SIMMONS 2,962,040
HIGH TEMPERATURE LIQUID METAL VALVE
Filed July 27, 1956
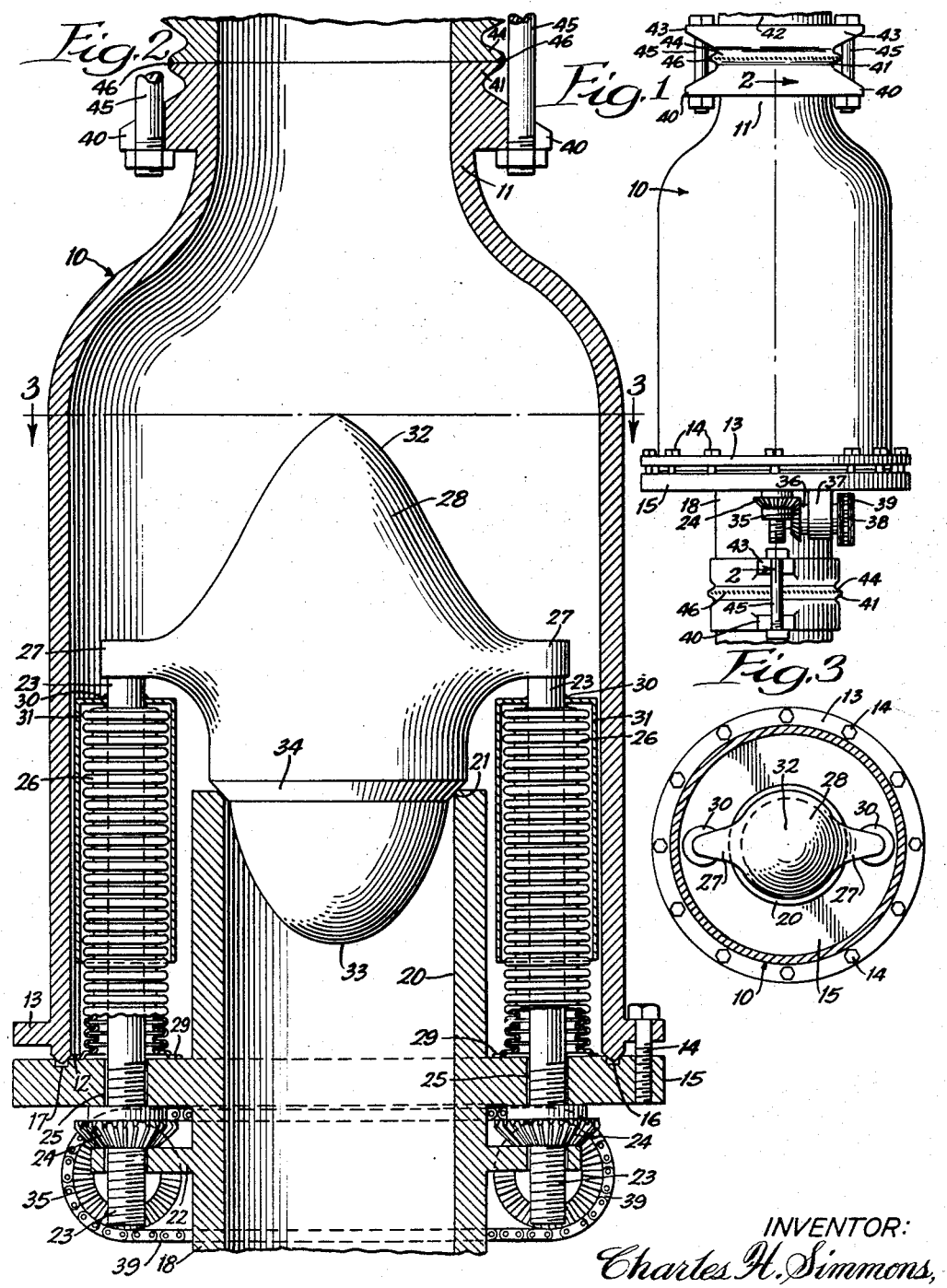
INVENTOR:
Charles H. Simmons,
BY Dawson, Tilton & Graham,
ATTORNEYS.

United States Patent Office 2,962,040
Patented Nov. 29, 1960

2,962,040

HIGH TEMPERATURE LIQUID METAL VALVE

Charles H. Simmons, Chicago, Ill.
(237 Broadmoor Ave., Munster, Ind.)

Filed July 27, 1956, Ser. No. 600,555

4 Claims. (Cl. 137—219)

This invention relates to a high temperature liquid metal valve and, more particularly, to a mechanism which combines the basic requirements of a tight shut-off, flow control, and sealed construction between inside and outside of the valve with low pressure drop, and a structure innerently stable for high temperature service. The valve will also be useful for other purposes.

The handling of high temperature liquid metals such as, for example, sodium, etc. which are under high temperature conditions and which have been exposed to nuclear radiation, presents serious problems in the avoidance of high pressure drop, leakage to the outside of the system, repairs, etc. For example, in the use of nuclear energy for commercial purposes, high temperature liquids such as liquid sodium must be controlled through the use of valves; such valves must not only perform under high temperature conditions with a low pressure drop in tne valve, but most also provide long trouble-free service with freedom from temperature warpage, other mechanical instability, etc., and in case of damage must be readily replaceable as an integral operating unit completely assembled, adjusted, etc. The foregoing problem also requires a valve with streamlined flow configuration which is effective in the fluid system for controlling flow while, at the same time, being effectively manipulated or controlled through mechanism permitting ready replacement of the valve element or unit in the event of radioactive contamination, etc., the valve element being replaceable separate from the operating mechanism. A further problem in handling high temperature liquid metals is the welding of bushings to shafts, sliding members to guides, etc., where such operating elements are in contact with liquid metals at elevated temperatures. A suitable valve must eliminate internal parts that involve close-running fits such as shafts in bushings, sliding members, etc., where these would be in contact with liquid metal at elevated temperature.

An object of the present invention is to provide a valve satisfying the above described needs and overcoming the above described disadvantages. A further object is to provide a valve structure in which the operating forces are balanced against each other and do not work through a closure joint such as a bonnet, cap, etc. Another object is to provide a valve mechanism that may be removed and replaced readily as an integral unit and which may be used in a pipeline or inserted in the side of a tank, vessel, etc. for controlling the flow into or from such tank, vessel, etc. A further object is to provide a valve structure in which the working parts are carried by a single closure member which may be readily removed and replaced in the case of radioactive contamination, injury, etc. Yet another object is to provide a valve and mechanism for operating the same with means for sealing the structure upon a removable part, while at the same time causing only a low pressure drop in the handling of high temperature liquids. Other specific objects and advantages will appear as the specification proceeds.

The invention is shown, in an illustrative embodiment, by the accompanying drawing, in which—

Figure 1 is a top plan view of a valve structure embodying my invention; Fig. 2, an enlarged longitudinal sectional view; and Fig. 3, a transverse sectional view, the section being taken as indicated at line 3—3 of Fig. 2.

In the illustration given, 10 designates a conduit or casing having an inlet opening 11 adapted to be connected to a pipe, etc., and naving an open rear end 12. Adjacent the rear end of the valve conduit or casing 10 is an annular seal welded flange 13 apertured to receive bolts 14. At both inlet and outlet ends may be bolted flanged joints with seal welds.

A closure plate 15 is secured against the rear end of the casing 10 by means of the bolts 14. Any suitable weld seal or pressure seal may be provided between the rear end of the casing 10 and plate 15. Since such seals are well known in the art, a detailed description herein is believed unnecessary. Suitable pressure seals are shown in detail in U.S. Patents 2,321,597; Re. 23,272; 2,443,187; and Re. 23,137. It will be sufficient for the purposes of this invention that any seal effective under the high pressures involved be employed.

The plate 15 is provided with an integral, rearwardly-extending outlet pipe portion 18, terminating in a joint adapting the same for connection with an outlet pipe according to the usual practice. Integral also with plate 15 is an inwardly-extending pipe portion 20 terminating in a valve seat 21. The rear pipe portion 18 is provided with an annular flange 22 apertured to receive a pair of screw rods 23. Each screw rod 23 threadedly engages a bevel gear 24 which, when rotated, will advance or retract the screw rod 23. The screw rods 23 pass through guide passages 25 in the plate 15 and thence extend through bellows 26 to the latterally-extending arms 27 of the valve poppet 28. The bellows 26 are welded at 29 to the plate 15 to form a tight seal therewith, and at their forward ends the bellows are welded at 30 to the screw rods 23. Thus there is provided a liquid-tight seal about that portion of the rods 23 extending between the forward end of the bellows and the plate 15.

To protect the bellows 26, a sheath 31 is welded to the forward or inner end of the rods 23, and the sheaths or guards extend rearwardly about the inner portions of the bellows.

The poppet 28 is streamlined to permit flow from the inlet to the outlet with a minimum of eddying or turbulence, and to this end the forward portion of the poppet, as indicated by the numeral 32, and the rear portion of the poppet, as indicated by the numeral 33, are shaped in accordance with streamlined principles, the poppet seat-engaging surfaces being beveled or inclined, as indicated at 34.

Any suitable means for operating the screw rods 23 to advance or retract the valve may be employed. In the illustration given, the bevel gears 24 mesh with side bevel gears 35 carried by shafts 36 rotatably supported in the mounting 37 formed integrally with closure plate 15, as shown best in Fig. 1. Each shaft 36 has at its other end a gear 38, and the two gears 38 are connected by a synchronizing chain 39. Upon the rotation of one of the shafts 36 by any means, a corresponding and synchronized movement of the other shaft 36 is brought about, and a simultaneous rotation of the shafts 23. Power or manual means may be provided for the operation of the actuating shaft 36 to bring about the synchronized movement of the two bevel gears 24.

In the illustration given, I have shown the inlet opening end 11 provided with a bolt-receiving lug or flange 40 and a seal lug 41. A pipe 42 is provided with a similar bolt-receiving lug or flange 43 and with a seal point or lug 44. A plurality of bolts 45 are employed for securing the members 42 and 10 together, and the sealing points 44 and 41 are closed with a seal weld 46. For separation of the parts, the weld 46 at the joint may be ground off and the parts 10 and 42 separated by removing the bolts 45. I prefer to employ at the outlet of the pipe 18 a similar bolt and flange and seal weld joint, as described in connection with the inlet opening section 11, but it will be understood that any suitable connections at these points may be made in the carrying out of my invention.

*Operation*

In the operation of the valve structure, liquid metal or other fluid enters the inlet opening 11 of the valve casing 10 and flows about poppet 28 and thence outwardly through the outlet pipe 20. When the valve is moved to the seated position shown in Fig. 2, a tight shutoff of flow is brought about, and in this operation the pressure on the fluid aids in the seating of the valve. By manipulating the gears shown in the drawing to effect rotation of bevel gears 24, the screw rods 23 are advanced to move the poppet 28 and the sealing surface 34 thereof away from the valve seat 21. When it is desired to seat the valve, the rotation of gears 24 is in the opposite direction to retract the rods 23 and to move the poppet surface 34 into engagement with the seat 21. In each of these operations, the bellows 26 provides a tight seal against the escape of fluid, while at the same time permitting forward and rearward movement of the valve 28.

Should the valve structure become unusable because of radioactive contamination in the control of the fluids passed through the valve, or should any injury occur to the valve-operating parts, it is merely necessary to remove the valve assembly from the pipeline by means provided and to lift out the self-contained valve structure. Defective or contaminated parts may then be removed and parts substituted therefor, or an entirely new valve assembly may be substituted. In this operation, a minimum of time is required. Great stability for the operating structures is afforded by reason of the plate structure which enables the actuating rods 23 to be guided in a direction perpendicular to the closure plate, while at the same time the pressure thrust with respect to the operating mechanism is against the closure plate itself in the manipulation of the valve parts. In the structure described, it will be noted that the casing 10 is in effect a simple shell or conduit, and that all of the operating parts are carried by the closure plate, which may be readily removed. The closure plate or structure may be a casting, forging, or any other form of structure capable of providing the support functions described above.

In the operation of the valve, there is a straight tension pull which seats the valve tight even under relatively low pressure. With the structure shown, a high seating force is obtained, while in the operation of the valve there is an extremely low pressure drop. The device is structurally sound, providing rigidity and strength at crucial points, permitting an extremely high seat loading, while at the same time, under flow-controlling operations, providing a remarkably low pressure drop.

While, in the foregoing specification, I have set forth a specific mechanism in considerable detail for the purpose of illustrating an embodiment of the invention, it will be understood that such details of mechanism may be varied widely by those skilled in the art without departing from the spirit of my invention.

I claim:

1. In combination with a conduit valve casing providing a substantially continuous smooth bore and having an open end providing a sealing edge, a closure plate having its inner face releasably secured to said edge in sealing relation, said plate being provided centrally with a fixed pipe portion extending outwardly for sealed connection with another pipe and having a portion extending inwardly in spaced relation to said casing and terminating in a valve seat, valve-actuating means adapted to be actuated from without said plate and extending through said plate and between said casing and said inwardly-extending pipe portion sealing means in sealing relation to said plate and actuating means, a streamlined poppet carried by said valve-actuated means in alignment with said valve seat and adapted to be moved by said means into and out of engagement with said valve seat, said closure plate, valve seat, poppet and valve-actuating means constituting a single unit removable from said conduit.

2. In a conduit for the flow of high temperature metal fluids, a valve casing interposed between sections of said conduit and sealed to one of said sections, said valve casing providing a continuous smooth bore having an open end, a removable assembly for closing the open end of said valve casing and comprising a closure plate sealed to the open end of said valve casing, said closure plate providing a flow aperture therethrough and having a pipe portion extending inwardly in spaced relation to said casing and providing a valve seat, and having also a fixed, outwardly-extending pipe portion communicating with said inwardly-extending pipe portion and adapted to be sealed to another of said conduit sections, valve-actuating means extending through said closure plate sealing means in sealing relation to said plate and valve-actuating means, and a streamlined poppet valve carried by said valve-actuated means in alignment with said valve seat and adapted to be moved thereby into and out of engagement with said valve seat, said assembly being removable as a unit from said valve casing.

3. The structure of claim 2 in which bellows extend about the portion of the valve-actuating means extending within said casing and within the space between said inwardly-extending pipe portion and said casing, said bellows being sealed to said plate and to said valve-actuating means.

4. The structure of claim 2 in which said closure plate is circular and is disposed intermediate the inwardly- and outwardly-extending pipe portions of said plate.

References Cited in the file of this patent

UNITED STATES PATENTS

| | | |
|---|---|---|
| 263,731 | Shaw | Sept. 5, 1882 |
| 2,343,134 | Cawood | Feb. 29, 1944 |
| 2,642,890 | Skewis | June 23, 1953 |
| 2,685,889 | Leighton | Aug. 10, 1954 |
| 2,708,563 | Backman | May 17, 1955 |

FOREIGN PATENTS

| | | |
|---|---|---|
| 582,397 | France | Oct. 13, 1924 |